UNITED STATES PATENT OFFICE.

RUDOLF GAHL, OF MORENCI, ARIZONA.

PROCESS OF TREATING COPPER ORES.

1,021,768.    Specification of Letters Patent.    Patented Apr. 2, 1912.

No Drawing.    Application filed January 28, 1911.  Serial No. 605,297.

*To all whom it may concern:*

Be it known that I, RUDOLF GAHL, a subject of the Emperor of Germany, residing at Morenci, in the county of Greenlee and State of Arizona, have invented certain new and useful Improvements in Processes of Treating Copper Ores, of which the following is a specification.

This invention consists in a method of treating ores containing copper and is suitable for all classes of ore on which concentrating processes have any effect. Concentrating processes in this sense embrace all the processes separating the ore into an enriched and an impoverished fraction, whether the acting force be gravity as in ordinary water and dry concentration, surface tension as in concentration by flotation, or of a magnetic or electrical nature as in electromagnetic and electrostatic processes, or of a different nature.

The object of the invention is to provide a method which will supplement the wasteful method of concentrating ores which is in general use at the present time. The shortcomings of this method have been realized heretofore and many attempts have been made to discard it and substitute a leaching process, but such attempts have met with very scant success. As almost all of the copper produced at the present time is derived from low-grade sulfid ores, it is evident that such a process, in order to be commercially valuable, must be very cheap in operation. For this reason all the processes requiring roasting of the ore can only have a limited field of application. Other processes extract the copper without roasting. Sulfuric acid which has been the principal chemical tried will effect only a very limited saving on most ores. Ferric sulfate which has also been used with or without sulfuric acid will effect a good extraction when the solution is sufficiently strong, the temperature sufficiently high and the time of leaching sufficiently long. All of these conditions mean, however, high expenses. This explains why leaching processes using these chemicals have not been successful and why the wasteful process of mechanical concentration has been used almost universally up to the present time.

I have discovered, now, that a very high extraction of the copper at a very low cost
can be obtained by combining the process of concentration with a leaching process employing the two chemicals named above. I effect the combination of the two processes by concentrating the ore first and leaching the tailings or impoverished fraction resulting from the concentration.

In carrying out my invention I modify the process of concentration, where existing conditions permit of a change. While heretofore in standard practice elaborate systems of grinding and regrinding preparatory to the actual concentration have been used in order to prevent such sliming of the economic minerals as would make them unfit for mechanical, electrical, magnetic, etc., treatment, my aim is merely to carry grinding far enough to insure practically complete liberation of the mineral particles inclosed in particles of gangue. I do not try to prevent sliming of the economic minerals, as, while it makes the mineral unfit for concentration, it is the best possible preparation for leaching. By thus simplifying the concentrating process I cheapen it.

While it is necessary to employ hot and strong leaching solutions and to let them act for a long time, if the attempt is made to extract the copper from the ore before it is subjected to the process of concentration, I have found that cold dilute solutions extract the copper in a very short time from the unroasted concentrator tailings, when the grinding has been carried far enough and the concentrating plant is efficient. Such dilute leaching solutions can be made very cheaply from the products of mine, concentrator or smelter. Ores or mine water high in iron often abound in copper mines or can be secured cheaply. The concentrates produced in the concentrating plant often carry a high percentage of iron. The smelters can furnish plenty of iron in the form of slag and sulfurous and sulfuric acid in their waste gases, while scrap-iron is produced in every metallurgical plant. Where the iron in these materials is already in the ferric condition as in some mine waters and in solutions prepared from oxidized or roasted ores, its solutions can be used directly for leaching purposes. In certain cases it may be possible to mix the iron oxid ore directly with the charge and leach the mixture with sulfuric acid, thus forming ferric sulfate during the leaching. But as the solution of iron oxid in this case takes place very slowly, I prefer first to prepare a solution of iron oxid in sulfuric acid and to apply this solution to the concentrator tailings.

Where local conditions are not favorable to the direct production of solutions of ferric sulfate, ferrous sulfate solutions can frequently be made at low cost. The ferruginous slag of smelters, especially converter slag, offers a large supply of ferrous iron which can be converted into ferrous sulfate by leaching either with sulfuric acid or with sulfurous acid in the presence of air. Scrap-iron can also be converted into ferrous sulfate by treating it with sulfuric acid, or sulfurous acid in the presence of air, or may be used for the precipitation of copper from solutions, thus producing ferrous sulfate solutions. Copper solutions for the treatment of which scrap-iron may advantageously be applied occur in copper mines as mine water and are also produced by this process. Having thus obtained a solution of ferrous sulfate I convert the ferrous iron into ferric iron. I may employ several methods for this purpose. Which one of them is best adapted to a certain case depends on local conditions.

Where a site is available for a reservoir of large size and where the rate of evaporation in the open air is high I conduct the ferrous solutions to this reservoir and allow them to evaporate. The same end may, of course, also be accomplished by artificial evaporation. Thus I obtain the dry salt in a more or less oxidized state. Preferably I expose this to the combined action of heat and air at a temperature below the decomposition point of the basic ferric sulfate formed by this step, which is around 600° C. The ferrous salt may, however, also be heated to a temperature above the decomposition point of the basic ferric sulfate, whereby iron oxid is formed and gases given off consisting mainly of sulfur trioxid which may be condensed or dissolved in water and used again for leaching purposes. Where local conditions are unfavorable to the evaporation of a large quantity of water or where water is too valuable to permit of such procedure, I precipitate the ferrous iron by lime and oxidize the precipitate, preferably by blowing air through the mixture. After the oxidation is complete I separate water and precipitate as far as desirable preferably by decantation and dissolve the ferric hydrate in sulfuric acid thus forming ferric sulfate.

Of the three oxidation processes above described, the first yields dry basic ferric sulfate or at least a substance containing a large proportion of this compound. This may be dissolved in acid and the solution used as a leaching agent. I have found, however, that it is not necessary to effect the solution before adding it to the leaching tank. It is usually sufficient to add the basic ferric sulfate and the acid separately. Even without the addition of any acid the basic salt acts as a dissolving agent, being reduced by copper minerals although insoluble in water. The second oxidation process produces ferric oxid which I find advisable to dissolve in acid, before adding it to the leaching tank. The third process produces ferric hydrate which may be dissolved in acid in the leaching tank itself.

The leaching and the separation of liquid and solids following the leaching are carried out by any of the methods known to the art, as is also the precipitation of the copper from the resulting solution, e. g., by electrolysis, iron, lime or matte.

The invention as above described may be modified in its application, such modifications lying, however, within the scope of the invention. To some of such possible modifications I desire to call special attention: (1.) Substances of known effect in facilitating the extraction of copper minerals, as for example salt, chlorin, bleaching powder, niter, manganese-peroxid or the like may be added to the leaching solutions, if the increased extraction warrants this. (2.) Should iron ore or roasted concentrates, used as a source of iron, contain a sufficient quantity of copper, this may be first extracted yielding a copper solution, which after treatment with iron for precipitation of the copper will be transformed into an iron solution, while the iron left in the ore is likewise available for the preparation of ferric solutions. (3.) To obtain a high extraction of the copper by combined concentrating and leaching, it is not necessary to subject all the tailings from the concentrator to the leaching process. By grinding the ore sufficiently fine and separating the tailings into different classes, e. g., into sand and slime tailings, it is possible to prepare one class of tailings containing so little copper, that they may be run to waste without being subjected to the leaching process.

It will be understood that the process may be cyclical in character, the ferrous solutions remaining after the precipitation of the copper, being reoxidized by any of the methods described and used for leaching further quantities of ore, after such addition of sulfuric acid as may be required.

In respect to the specific conditions preferably employed for carrying the invention into effect, it may be stated that for leaching low-grade slime containing for example one per cent. of copper, the concentration of ferric iron in the leaching solution is usually less than one per cent., while the concentration of sulfuric acid may attain or somewhat exceed one per cent. For leaching higher grade or more granular materials it is advisable to use stronger solutions.

I claim:

The process of treating unroasted copper ores, which consists in concentrating the ores under conditions yielding tailings of such degree of subdivision that the copper therein is substantially soluble in a solution containing ferric iron and sulfuric acid, and then extracting the copper from said tailings by said solution.

In testimony whereof, I affix my signature in presence of two witnesses.

RUDOLF GAHL.

Witnesses:
FORD F. QUIGLEY,
CHAS. F. SHERMAN.

Copies of this patent may be obtained for five cents each, by addressing the "Commissioner of Patents, Washington, D. C."